US012643508B2

(12) United States Patent
Ehlers

(10) Patent No.: US 12,643,508 B2
(45) Date of Patent: Jun. 2, 2026

(54) CONTROL DEVICE AND METHOD FOR IMPROVING THE MEASURING ACCURACY OF AN ON-BOARD VEHICLE AXLE LOAD MEASUREMENT SYSTEM

(71) Applicant: ZF CV Systems Global GmbH, Bern (CH)

(72) Inventor: Arne Ehlers, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 67 days.

(21) Appl. No.: 18/641,051

(22) Filed: Apr. 19, 2024

(65) Prior Publication Data

US 2024/0262323 A1    Aug. 8, 2024

Related U.S. Application Data

(63) Continuation of application No. PCT/EP2022/076565, filed on Sep. 23, 2022.

(30) Foreign Application Priority Data

Oct. 20, 2021    (DE) ..................... 10 2021 127 210.6

(51) Int. Cl.
*B60T 7/12* (2006.01)
*B60G 17/017* (2006.01)
(Continued)

(52) U.S. Cl.
CPC .............. *B60T 7/12* (2013.01); *B60G 17/017* (2013.01); *B60T 8/172* (2013.01); *B60T 8/1887* (2013.01); *G01G 19/10* (2013.01); *B60G 2400/60* (2013.01)

(58) Field of Classification Search
CPC ........ B60G 17/017; B60G 2400/60–61; B60T 7/12; B60T 8/172; B60T 8/18;
(Continued)

(56) References Cited

U.S. PATENT DOCUMENTS

| | | | |
|---|---|---|---|
| 7,702,433 | B2 | 4/2010 | Hecker et al. |
| 2021/0048333 | A1 | 2/2021 | Zhang et al. |

(Continued)

FOREIGN PATENT DOCUMENTS

| | | |
|---|---|---|
| DE | 10 2018 132 697 A1 | 6/2020 |
| DE | 10 2019 205 426 B3 | 9/2020 |

(Continued)

OTHER PUBLICATIONS

Barlsen, EP 1800916, machine translation. (Year: 2007).*
(Continued)

*Primary Examiner* — Mark L. Greene
(74) *Attorney, Agent, or Firm* — Walter Ottesen, P.A.

(57) ABSTRACT

A control device is for a vehicle and a method is for improving the measuring accuracy of an on-board vehicle axle load measurement system during a loading or unloading process and/or during the levelling of a stationary vehicle, wherein a wheel brake is assigned to each vehicle wheel, and wherein each wheel brake is actuatable via an on-board vehicle electronic braking system. The control device is configured to control the electronic braking system such that the latter, by the repeated engagement and/or release of at least one or more of the wheel brakes, reduces mechanical stresses within the vehicle body which impair the accuracy of the axle load measurement system. A method is for operating this control device.

15 Claims, 1 Drawing Sheet

(51) Int. Cl.
    *B60T 8/172*      (2006.01)
    *B60T 8/18*       (2006.01)
    *G01G 19/10*     (2006.01)

(58) Field of Classification Search
    CPC ...... B60T 8/1887; G01G 19/08; G01G 19/10;
                                        G01G 19/12
    See application file for complete search history.

(56)                  References Cited

U.S. PATENT DOCUMENTS

| | | |
|---|---|---|
| 2022/0057252 A1 | 2/2022 | Krueger et al. |
| 2022/0288991 A1 | 9/2022 | Lucas et al. |
| 2022/0381602 A1 | 12/2022 | Zhang et al. |

FOREIGN PATENT DOCUMENTS

| | | | |
|---|---|---|---|
| DE | 10 2019 111 187 A1 | 11/2020 | |
| EP | 1 800 916 A1 | 6/2007 | |
| EP | 3 778 332 A1 | 2/2021 | |
| SE | 541911 C2 * | 1/2020 | ............ B60W 10/22 |

OTHER PUBLICATIONS

English translation and Written Opinion of the International Searching Authority dated Jan. 10, 2023 for international application PCT/EP2022/076565 on which this application is based.
International Search Report of the European Patent Office dated Jan. 10, 2023 for international application PCT/EP2022/076565 on which this application is based.

* cited by examiner

CONTROL DEVICE AND METHOD FOR IMPROVING THE MEASURING ACCURACY OF AN ON-BOARD VEHICLE AXLE LOAD MEASUREMENT SYSTEM

CROSS-REFERENCE TO RELATED APPLICATIONS

This application is a continuation application of international patent application PCT/EP2022/076565, filed Sep. 23, 2022, designating the United States and claiming priority from German application 10 2021 127 210.6, filed Oct. 20, 2021, and the entire content of both applications is incorporated herein by reference.

TECHNICAL FIELD

The disclosure relates to a control device for a vehicle such as, for example, a heavy goods vehicle, either with or without a trailer vehicle, or a tractor unit, either with or without a semi-trailer, or a trailer vehicle or semi-trailer, for improving the measuring accuracy of an on-board vehicle axle load measurement system during a loading or unloading process and/or during the levelling of a stationary vehicle, wherein a wheel brake is assigned to each vehicle wheel of the vehicle, and wherein each wheel brake is actuatable via an on-board vehicle electronic braking system. The disclosure further relates to a method for operating this control device.

BACKGROUND

The measurement of weight loads acting on the air-sprung or steel-sprung axles of a vehicle via an on-board vehicle axle loading system is known. As a result, a time-intensive and, under certain circumstances, repeated passage over a stationary vehicle weighbridge in order to determine the total axle load of the vehicle by a comparison of the total unladen weight with the total weight of the vehicle in a laden state can be omitted. Accurate knowledge of the total axle load and individual axle loads of a heavy goods vehicle is highly significant in freight traffic, as any overshoot of the permissible axle load results in substantial vehicle and road damage. The intensity of road surface loading, and thus the risk of occurrence of road damage, increases by a power of four in relation to the axle load of a vehicle. On the grounds of this relationship, increasingly stringent standards are applied to the accuracy of on-board axle load measurement systems, particularly in heavy goods vehicles.

In vehicle axles with electronically controlled air suspension, the weight load acting on the respective vehicle axle, and thus the axle load applied, is inferred from air pressures which are measured via pressure sensors in the respective air suspension bellows. In conventional steel leaf-sprung axles, a load-related strain of steel springs can be measured via strain gauges or displacement measurement sensors, and employed for the determination of a related axle load. It is further known for a mechanical coupling rod to be arranged between a vehicle axle, on which the axle load acting thereupon is to be measured, and a vehicle body. Via the coupling rod, a load-related depression of the vehicle body or chassis in the direction of the vehicle axle is convertible, for example, into a rotary motion, which is measurable via a rotary angle sensor and can then be evaluated. By reference to measured values delivered by the rotary angle sensor, the effective axle load can then be calculated. Alternatively, the load-related downward movement of the vehicle body in relation to a vehicle axle can be determined directly via a linear displacement measuring sensor which, for example, is directly integrated in a shock-absorber, and is thus effectively protected against adverse environmental influences. Again, measurement values herefrom are then converted into axle load values in an electronic device.

All known methods of axle load measurement have a disadvantage, in that the results of measurement are corrupted by forces in the suspension and in the vehicle axle which are superimposed upon the respective measurement and/or by mechanical stresses in the vehicle body and running gear, which can occur during loading and unloading, or in conjunction with the levelling of the vehicle.

SUMMARY

The object of the disclosure is therefore the improvement of the accuracy of an on-board vehicle axle load measurement system, particularly during loading and unloading and/or during a levelling of the vehicle.

This object is, for example, fulfilled by a control according to the disclosure. The aforementioned object is, for example, also fulfilled by a method according to the disclosure.

Accordingly, the disclosure firstly relates to a control device for a vehicle having a plurality of vehicle wheels, for improving the measuring accuracy of an on-board vehicle axle load measurement system during a loading or unloading process and/or during the levelling of a stationary vehicle, wherein a wheel brake is assigned to each vehicle wheel, and wherein each wheel brake is actuatable via an on-board vehicle electronic braking system. The vehicle can be, for example, a heavy goods vehicle, either with or without a trailer vehicle, or a tractor unit with a semi-trailer.

For the fulfilment of the device-related object, it is provided that the control device is configured to control the electronic braking system such that the latter, by the repeated engagement and/or release of at least one or more of the wheel brakes, reduces mechanical stresses within the vehicle body which impair the accuracy of the axle load measurement system.

In this context, a wheel brake engagement is understood as a service position of the wheel brake in which effective braking is executed by the latter. The engagement of a wheel brake thus signifies that the latter assumes a service position in which it executes effective braking. A released wheel brake thus assumes a service position in which effective braking is not executed by the latter.

Via the control device, the accuracy of on-board vehicle axle load measurement, particularly during a loading or unloading process and/or during levelling, can be significantly improved, as this specifically permits the relief of stresses in the vehicle body associated with the above-mentioned processes. Further to such stress relief in the vehicle body, the respective axle load can then be determined in an accurate manner. Accordingly, no axle load measurement values are generated which are inaccurate on the grounds of stress.

As mentioned, the electronic braking device can be actuated via the control device for the execution of the method, which has yet to be described. To this end, a high-performance data connection is provided between the on-board vehicle electronic braking system and the control device, which is preferably embodied in the form of a bidirectional data line. The control device is thus able to employ the functionality of the electronic braking system for the control of wheel brakes in combination with the purposes of the present disclosure.

According to a further configuration, it is provided that the control device is configured, during a loading or unloading process and/or during a levelling operation, notwithstanding the repeated engagement and/or release of at least one or more of the wheel brakes, to ensure the roll-away protection of the vehicle, and also to prevent any lateral movements. Thus, by the execution of the method, operational security is ensured during a loading or unloading process and/or during a levelling operation, in any situation. Consequently, via the control device, at any given time, the number of wheel brakes which are simultaneously releasable is restricted such that, in particular, roll-away protection of the vehicle is not compromised at any time.

It can further be provided that the control device is an integral component of the electronic braking system of the vehicle. This generates potential for the reduction of manufacturing costs, as the on-board vehicle electronic braking system simultaneously assumes the function of the control device and, accordingly, at least one control device housing can be economized.

The control device can preferably be configured, upon the expiry of a pre-definable time interval, to engage at least a proportion of previously released wheel brakes and to release at least a proportion of previously engaged wheel brakes. Released and engaged wheel brakes of the vehicle can be identified within the control device, for example via a binary number.

A further embodiment of the control device is characterized in that the time interval, which is controlled by the control device, is adjustable to a value between 1 second and 10 minutes. As a result, according to the respective and specific properties of a vehicle and/or of a load, an appropriate time interval can be predefined for the relief of mechanical stresses. The control device is thus configurable for different vehicle types and/or for the application thereof. Consequently, any manual adjustability of this time interval by the driver of the vehicle is not adjudged to be advantageous.

The control device can preferably include a hardware circuit and/or a software which is saved in the control device for executing the process according to the method. A hardware circuit of this type within the control device can be embodied, for example, in the form of a programmable logic gate arrangement. A software solution can be embodied, for example, in the form of a program or a software application which ensures the repeated engagement and release of wheel brakes in accordance with the method according to the disclosure. The program or software application can be executable, for example, on a computing unit which is assigned to the control device. Alternatively, the program or software application can also be executable on a computing unit or on the control device of the on-board vehicle electronic braking system in combination with other program modules such that, essentially, no additional hardware is required.

The above-mentioned method-related object is, for example, fulfilled by a method for improving the measuring accuracy of an on-board vehicle axle load measurement system which is active during a loading or unloading process and/or during the levelling of a stationary vehicle. On the vehicle, a wheel brake is assigned to each vehicle wheel which is actuatable via an on-board vehicle electronic braking system. The method includes:

a) the engagement of all wheel brakes prior to the commencement of the loading or unloading process and/or prior to the commencement of levelling;

b) on the stationary vehicle, the release of a maximum number of wheel brakes such that any independent roll-away, even of a full-laden vehicle, will be prevented via the remaining engaged wheel brakes;

c) expiry of a predefined time interval, which is appropriate for the reduction of mechanical stresses within the vehicle body and/or running gear which will compromise the accuracy of the axle load measurement system;

d) the engagement of at least one or more of the previously released wheel brakes, wherein this proportion of wheel brakes is independently capable of ensuring roll-away protection;

e) release of the wheel brakes which have been engaged over a longer period;

f) measurement of the axle load on at least one vehicle axle;

g) repetition of steps c) to f), until such time as the loading or unloading process and/or the levelling operation is terminated.

As a result, by the employment of on-board vehicle means, an effective relief of mechanical stresses in the region of the vehicle body, suspension and/or axles is possible which might otherwise result in a corruption of the measurement results of the on-board vehicle axle load system.

According to a further embodiment of the method, it is provided that each of the wheel brakes is individually actuatable. A procedure of this type can then be employed, for example, if the trailer vehicle is configured as a semi-trailer having a trailing axle, or if the trailer vehicle is configured as a drawbar trailer having a steering axle. As a result, stresses in the vehicle body and/or running gear of trailer vehicles having a comparatively complex axle configuration can be relieved in a particularly effective manner.

Alternatively, in the event of a comparatively simple axle configuration of the trailer vehicle, it can be provided that, with respect to the braking actuation thereof, a plurality of wheel brakes are combined in a group and, accordingly, are only actuated in combination or simultaneously. The method according to the disclosure is thus also applicable, in a problem-free manner, to comparatively simple and cost-effectively practicable axle configurations of the type which are encountered, for example, in simple semi-trailers or simple drawbar trailers.

A procedure is further advantageous wherein it is provided that the wheel brakes are engaged and released such that, in the event of the employment of a pneumatic braking system, on the one hand, compressed-air consumption is restricted within the limits of necessity and, on the other, in addition to the prevention of any unintentional roll-away of the vehicle, an at least substantial reduction of mechanical stresses is nevertheless achieved. Accordingly, the respective wheel brakes are only engaged or released to the extent that an immobilization of the associated wheel is achieved, or a rotation of the associated wheel is permitted. This permits a minimization of compressed-air consumption, as a result of which the operation of an air compressor is required less frequently, ultimately resulting in an economization of fuel or electrical energy.

Alternatively, it can be provided that the wheel brakes are engaged and released such that, in addition to the prevention of any unintentional roll-away of the vehicle, a maximum possible reduction of mechanical stresses is achieved. A particularly rapid relief of mechanical stresses is thus pro-vided, with no impairment of the operational security of the vehicle during the loading or unloading thereof. In this procedure, in the event of the employment of a pneumatic braking system, a comparatively high compressed-air con-sumption is to be anticipated, although the particularly rapid relief of mechanical stresses which are to be eliminated in the vehicle is permitted accordingly.

Preferably, those wheel brakes which are to be released or engaged in process steps d) and e) are selected in accordance with a plausibility check of axle load values from the on-board vehicle axle load measurement system which is executed during or after process step d). As a result, the number of wheel brakes to be released or engaged can be determined. By a comparison of the outcome of the plausi-bility check for two process sequences, preferably executed in immediate succession, it can be ascertained whether any improvement in the accuracy of axle load measurement values has occurred. If this is not the case, a targeted resetting can be executed by varying the number of wheel brakes which are to be released or engaged.

Axle load values are preferably ascertained further to the expiry of the waiting time, such that any oscillations of the vehicle associated with the preceding engagement or release of wheel brakes will have sufficiently decayed.

The predefined time interval preferably lies between 1 second and 10 minutes and will be variable, particularly in accordance with the speed of load variations associated with a loading and unloading process and/or with a levelling operation. As a result, a sufficient time span is provided for the relief of unwanted mechanical stresses in the vehicle body and in the vehicle axles.

According to a further configuration of the method, at least one wheel brake remains engaged at any time during a loading or unloading process and/or during a levelling operation of the vehicle. It is thus ensured, under all cir-cumstances, that the vehicle will not unintentionally be set in motion. Preferably, all the wheel brakes on at least one vehicle axle remain engaged, in order to prevent any oblique pull of the vehicle in relation to its longitudinal axis.

Finally, it can be provided that a transition between the engaged or released state of each wheel brake, or vice versa, is executed softly rather than abruptly. In consequence, any oscillatory rocking of the vehicle, and an associated risk of corruption of measurement results from the on-board vehicle axle load measurement system, are prevented.

BRIEF DESCRIPTION OF DRAWINGS

The invention will now be described with reference to the drawings wherein.

DETAILED DESCRIPTION

Figures 1, 2:
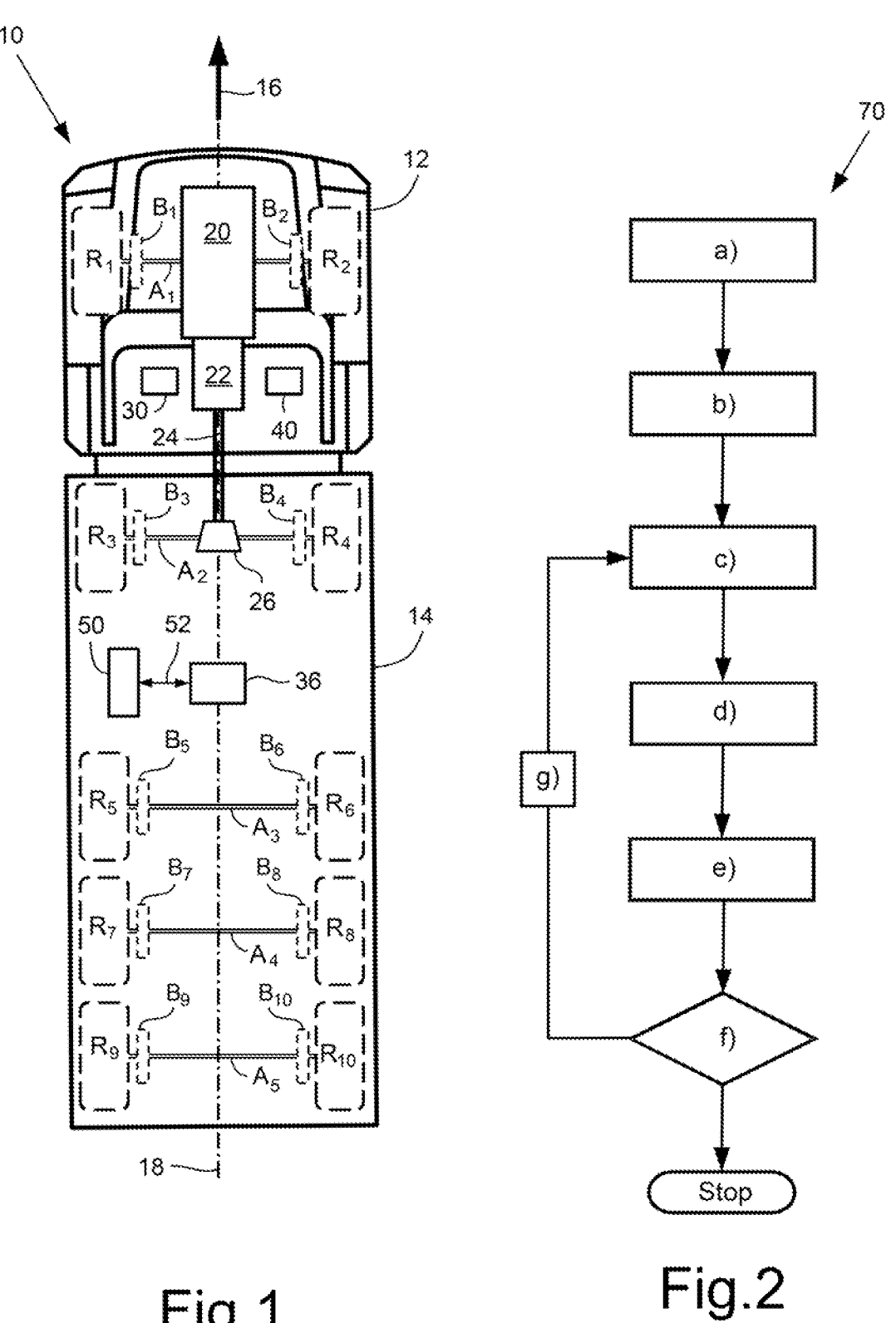
FIG. 1 shows a schematic overhead view of a vehicle with a control device according to the disclosure; and, FIG. 2 shows a schematic flow diagram of the method according to the disclosure, employing the control device according to FIG. 1.

The vehicle 10 represented in FIG. 1, for exemplary purposes only, is configured here as a tractor unit 12 having a coupled semi-trailer 14. Alternatively, the vehicle 10 can also be a heavy goods vehicle, with or without a trailer vehicle. Here, the tractor unit 12 includes two axles $A_1$, $A_2$, and the semi-trailer 14 is equipped with three axles $A_3$, $A_4$, $A_5$. The tractor unit 12 is equipped with a drive unit 20, which is configured as a drive motor and which, via a down-circuit gearbox 22, a differential 26 and a take-off shaft 24, can drive the second axle $A_2$ of the tractor unit 12.

Two wheels $R_1$, $R_2$ are arranged on the first axle $A_1$ of the tractor unit 12, and two wheels $R_3$, $R_4$ are arranged on the second axle $A_2$. The semi-trailer 14, on the first axle $A_3$ thereof, includes the two wheels $R_5$, $R_6$, the second axle $A_4$ includes the two wheels $R_7$, $R_8$, and the third axle $A_5$ includes the two wheels $R_9$, $R_{10}$. The odd-numbered wheels $R_1$, $R_3$, $R_5$, $R_7$, $R_9$ are arranged to the left, in relation to the longitudinal axis 18 of the vehicle 10, whereas the even-numbered wheels $R_2$, $R_4$, $R_6$, $R_8$, $R_{10}$ are arranged to the right, in relation to the longitudinal axis 18 of the vehicle. Accordingly, the axle positions of the ten wheels $R_1$, . . . , $R_{10}$ on the five vehicle axles $A_1$, $A_2$, $A_3$, $A_4$, $A_5$ are clearly defined. The forward direction of travel 16 is indicated by an arrow.

In the region of the tractor unit 12, the vehicle 10 is equipped with an on-board vehicle axle load measurement system 30 ("OnBoard Weighing"-System; OBW-System for short), via which axle loads acting on the individual axles $A_1$, $A_2$, $A_3$, $A_4$, $A_5$ are measurable. From the measured individual axle loads, via the axle load measurement system 30, an overall axle load of the vehicle 10 is calculable from the sum of the individual axle loads. The vehicle 10 can include, for example, electronically controlled air suspen-sion, conventional steel-sprung axles, or a combination of the two.

The vehicle 10 is further equipped with an electronic braking system 36 and an on-board computer 40. Exactly one wheel brake $B_1$, . . . , $B_{10}$, which is pneumatically or hydraulically actuatable, is assigned to each vehicle wheel $R_1$, . . . , $R_{10}$ of the vehicle 10. Preferably, each of these wheel brakes $B_1$, . . . , $B_{10}$, under the control of the electronic braking system 36, can be individually engaged or released. Although, in the interests of clarity, the pneumatic or hydraulic hoses required for this purpose are not represented in FIG. 1, the layout thereof will be sufficiently known to a person skilled in this field.

The vehicle 10 is further equipped with a control device 50 according to the disclosure, which is employed for improving the accuracy of the ascertainment of axle loads by the on-board vehicle axle load measurement system 30, particularly during loading or unloading and/or during a levelling operation of the vehicle 10. The electronic braking system 36 of the vehicle 10 is actuatable and/or regulable or controllable by the control device 50, wherein the exchange of data between these two units is executed via a bidirec-tional data line 52. By way of deviation from the represen-tation according to FIG. 1, the electronic braking system 36 and the control device 50 can also be entirely arranged within the tractor unit 12, or can be functionally distributed between the semi-trailer 14 and the tractor unit 12.

By the repeated release or engagement of a specific number of wheel brakes $B_1$, . . . , $B_{10}$ on the axles $A_1$, $A_2$, $A_3$, $A_4$, $A_5$ of the stationary vehicle 10 during a loading or unloading process or during a levelling operation, under the constant monitoring of the control device 50, mechanical stresses, particularly in the vehicle body and/or in the running gear, can be reduced to a substantial extent. As mechanical stresses of this type customarily corrupt axle load measurement values which are delivered by an axle load measurement system 30, the accuracy of axle load measurement values from the axle load measurement system 30 can be considerably improved via the control device 50 according to the disclosure.

For reasons of safety, at no time during the loading or unloading process and/or during the levelling operation is the number of wheel brakes $B_1$, . . . , $B_{10}$ which are simultaneously released sufficiently large such that roll-away protection of the vehicle 10 is no longer ensured. Consequently, the vehicle 10 cannot be unintentionally set in forward motion or rotary motion.

The control device 50 can optionally be configured as an integral and functional component of the electronic braking system 36 of the vehicle 10, as a result of which a simpler and more cost-effective configuration is provided.

An exclusively hardware-based circuit of the control device 50 can be embodied, for example, in the form of a programmable logic gate arrangement. An at least partially software-based solution can be embodied, for example, in the form of a program for ensuring the repeated engagement or release of specific wheel brakes $B_1, \ldots, B_{10}$ further to the expiry of a predefined time interval during a loading and unloading process and/or during a levelling operation by the method according to the disclosure in a stationary vehicle 10. The program is executable, either in an electronic memory of the control device 50 and/or in an electronic memory of the electronic braking system 36.

The axle load measurement system 30, the electronic braking system 36, the control device 50 and the on-board computer 40 of the vehicle 10 are respectively coupled via an unrepresented bidirectional digital data link, such as a CAN bus system or similar, and are thus capable of comprehensive mutual communication. The same applies to unrepresented sensors which are assigned to the above-mentioned systems.

FIG. 2 shows a schematic flow diagram for the operation of the method proposed herein, by the employment of the control device 50 according to FIG. 1. This method is intended, during a loading or unloading process and/or during a levelling operation of the vehicle 10 according to FIG. 1, to execute the most effective possible reduction of mechanical stresses, particularly in the region of the vehicle body or running gear, as these mechanical stresses can result in a corruption of axle load measurement values from the on-board vehicle axle load measurement system, and thus of the accuracy of the determinable value of the current overall weight of the vehicle.

Once the vehicle 10, for example, has achieved its intended loading position or unloading position on a loading ramp and is stationary, in a first process step a), prior to the commencement of a loading or unloading process and/or prior to the commencement of a levelling operation, all the wheel brakes $B_1, \ldots, B_{10}$ are engaged, such that these execute a braking action on the assigned vehicle wheels $R_1, \ldots, R_{10}$.

According to a second process step b), prior to the commencement of the loading or unloading process and/or prior to the commencement of a levelling operation, the wheel brakes $B_1, \ldots, B_{10}$ are released to a maximum number such that, via the remaining engaged wheel brakes $B_1, \ldots, B_{10}$, any unintentional roll-away of the vehicle 10 is prevented, even in the event of a fully-laden vehicle 10.

In the subsequent third process step c), the expiry of a predefined time interval is awaited which is appropriate for reducing mechanical stresses within the vehicle body and/or running gear which impair the accuracy of the axle load measurement system 30.

The above-mentioned time interval can range, for example, from 1 second to 10 minutes. It can vary, for example, in accordance with the speed of load variations associated with a loading or unloading process and/or with a levelling of the vehicle. The greater a load variation, the longer the decay time of any resulting torsion, oscillations or movements in the vehicle, and the longer the time until the release or engagement of further wheel brakes $B_1, \ldots, B_{10}$ can be permitted without compromising the accuracy of axle load measurement.

Thereafter, in a fourth process step d), the engagement of at least one or more of the previously released wheel brakes $B_1, \ldots, B_{10}$ is executed, wherein this proportion of wheel brakes $B_1, \ldots, B_{10}$ is independently capable of ensuring roll-away protection or preventing any unintentional movements of the vehicle 10.

In the subsequent fifth process step e), the release of those wheel brakes $B_1, \ldots, B_{10}$ which have been engaged over a longer period is executed. As a result of this overlap of brake actuation, a seamless braking action on the wheel brakes $B_1, \ldots, B_{10}$ is ensured.

Thereafter, in a sixth process step f), a stress-relieved measurement of the axle load on at least one of the vehicle axles $A_1, A_2, A_3, A_4, A_5$ is executed.

According to a seventh process step g), process steps c) to f) are repeated until such time as the loading or unloading process and/or the levelling operation is fully terminated (process step: stop).

According to the method, the wheel brakes $B_1, \ldots, B_{10}$ are engaged and released such that, in addition to the prevention of any unintentional movement of the vehicle, a maximum possible reduction of mechanical stresses, particularly in the vehicle body and in the running gear, is simultaneously achieved.

Via the axle load measurement system, axle loads are preferably measured further to the expiry of the time interval in the third process step c) on the grounds that, by this time, mechanical stresses and oscillations which impair measurements will have substantially decayed.

Wheel brakes $B_1, \ldots, B_{10}$ which are to be released or engaged according to process steps d) and e) can be selected, for example, in accordance with the outcome of a plausibility check of axle load values from the on-board vehicle axle load measurement system which, in particular, is executed during or after the third process step c). In the context of this plausibility check, the axle load measurement system executes a check as to whether individual axle load measurement values lie so far outside a predefined error interval or expectation interval that a measuring error associated with mechanical stresses within the vehicle body, mechanical oscillations, an improper operation, sensor errors or similar is to be assumed. By a comparison of the outcome of plausibility checks for two process sequences, preferably executed in immediate succession, it can be ascertained whether any improvement in the accuracy of axle load measurement values from the axle load measurement system has occurred. If this is not the case, an improvement in the accuracy of axle load measurement values can be achieved by the release or engagement of the wheel brakes $B_1, \ldots, B_{10}$, controlled by the control device 50, employing the electronic braking system 36.

The length of the time interval according to the third process step c), the expiry of which is awaited prior to any further release or engagement of wheel brakes on the axles, can also be varied in accordance with the outcomes of plausibility checks within the predefined margins of 1 second and, for example, 10 minutes. This can be executed additionally or alternatively to the variation of the time interval in accordance with the speed of load variations associated with the loading and unloading process and/or with a levelling operation of the vehicle.

Regardless of the outcomes of optional plausibility checks, at least one wheel brake will remain engaged at any time, wherein preferably two wheel brakes on the same vehicle axle are respectively maintained in a braking state, in order to prevent any oblique pull of the vehicle during a loading or unloading process, or during a levelling operation.

The transition between an engaged and released state of a wheel brake, or vice versa, is not executed abruptly, but with a temporal overlap. In the context of the present description, this signifies that a braking force is not increased abruptly, that is, within a short time interval of less than one second, from 0% to 100% or, conversely, is not reduced from 100% to 0%. Instead, it is provided that the temporal braking force characteristic, for example, assumes a uniformly ramped profile, that is, increases linearly on one wheel brake and decreases linearly on the other wheel brake, for example on the same vehicle axle. In general, however, this type of actuation of wheel brakes $B_1, \ldots, B_{10}$ is only possible in the case of hydraulic brakes, but is not achievable in pneumatic brakes.

It is understood that the foregoing description is that of the preferred embodiments of the invention and that various changes and modifications may be made thereto without departing from the spirit and scope of the invention as defined in the appended claims.

LIST OF REFERENCE SYMBOLS (PART OF DESCRIPTION)

10 Vehicle
12 Tractor vehicle, tractor unit
14 Trailer vehicle, semi-trailer
16 Forward direction of travel
18 Longitudinal axis of the vehicle
20 Drive unit, drive motor
22 Gearbox
24 Take-off shaft
30 Axle load measurement system of the vehicle
36 Electronic braking system
40 On-board computer
50 Control device
52 Data line
70 Flow diagram
a)-g) Process steps
$A_1, A_2$ Vehicle axles, axles of tractor vehicle
$A_3, A_4, A_5$ Vehicle axles, axles of trailer vehicle
$R_1, \ldots, R_{10}$ Vehicle wheels
$B_1, \ldots, B_{10}$ Wheel brakes
The invention claimed is:

1. A control device for a vehicle having a plurality of vehicle wheels, the device being for improving the measuring accuracy of an on-board vehicle axle load measurement system during at least one of loading, unloading, and levelling of a stationary vehicle, wherein a wheel brake is assigned to each vehicle wheel, and wherein each wheel brake is actuatable via an on-board vehicle electronic braking system, the control device comprising:

a non-transitory computer readable storage medium having program code stored thereon, wherein said program code is for controlling the electronic braking system such that the electronic braking system reduces mechanical stresses within a vehicle body which impair the accuracy of the axle load measurement system; and, said program code, when executed by a processor, being configured to:

a) engage all wheel brakes prior to a commencement of the at least one of loading, unloading, and leveling of the stationary vehicle;

b) on the stationary vehicle, release a maximum number of wheel brakes such that any independent roll-away of the vehicle will be prevented via the remaining engaged wheel brakes;

c) finish a predefined time interval, which is appropriate for a reduction of mechanical stresses within at least one of a vehicle body and running gear which impair the accuracy of the axle load measurement system;

d) engage at least one or more of previously released wheel brakes, wherein said at least one or more of previously released wheel brakes is independently capable of ensuring roll-away protection;

e) release one or more of the wheel brakes which have been engaged over a longer period;

f) measure the axle load on at least one vehicle axle; and g) repeat c) to f), until the at least one of loading, unloading, and levelling of the stationary vehicle is terminated.

2. The control device of claim 1, wherein the control device is configured, during the at least one of loading, unloading, and levelling of the stationary vehicle to ensure a roll-away protection of the vehicle.

3. The control device of claim 1, wherein the control device is an integral component of the electronic braking system of the vehicle.

4. The control device of claim 1, wherein the control device is configured, upon the expiry of a pre-definable time interval, to engage at least a proportion of previously engaged wheel brakes and to release at least a proportion of the previously engaged wheel brakes.

5. The control device of claim 4, wherein said control device is configured to control the pre-definable time interval; and, said pre-definable time interval is adjustable to a value between 1 second and 10 minutes.

6. A control device for a vehicle having a plurality of vehicle wheels, the device being for improving the measuring accuracy of an on-board vehicle axle load measurement system during at least one of loading, unloading, and levelling of a stationary vehicle, wherein a wheel brake is assigned to each vehicle wheel, and wherein each wheel brake is actuatable via an on-board vehicle electronic braking system, the control device comprising:

a hardware circuit for controlling the electronic braking system such that the electronic braking system reduces mechanical stresses within a vehicle body which impair the accuracy of the axle load measurement system;

said hardware circuit being configured to:

a) engage all wheel brakes prior to a commencement of the at least one of loading, unloading, and leveling of the stationary vehicle;

b) on the stationary vehicle, release a maximum number of wheel brakes such that any independent roll-away of the vehicle will be prevented via the remaining engaged wheel brakes;

c) finish a predefined time interval, which is appropriate for a reduction of mechanical stresses within at least one of a vehicle body and running gear which impair the accuracy of the axle load measurement system;

d) engage at least one or more of previously released wheel brakes, wherein said at least one or more of previously released wheel brakes is independently capable of ensuring roll-away protection;

e) release one or more of the wheel brakes which have been engaged over a longer period;

f) measure the axle load on at least one vehicle axle; and g) repeat c) to f), until the at least one of loading, unloading, and levelling of the stationary vehicle is terminated.

7. A method for improving measuring accuracy of an on-board vehicle axle load measurement system of a vehicle during at least one of a loading process, an unloading process and during a levelling of a stationary vehicle, wherein a wheel brake is assigned to each of a plurality of vehicle wheels, and wherein each wheel brake is actuatable via an on-board vehicle electronic braking system, the method comprising:

a) engaging all wheel brakes prior to a commencement of the at least one of the loading process, the unloading process, and the leveling of the stationary vehicle;

b) on the stationary vehicle, releasing a maximum number of wheel brakes such that any independent roll-away of the vehicle will be prevented via the remaining engaged wheel brakes;

c) finishing of a predefined time interval, which is appropriate for a reduction of mechanical stresses within at least one of a vehicle body and running gear which impair the accuracy of the axle load measurement system;

d) engaging of at least one or more of previously released wheel brakes, wherein said at least one or more of previously released wheel brakes is independently capable of ensuring roll-away protection;

e) releasing one or more of the wheel brakes which have been engaged over a longer period;

f) measuring of the axle load on at least one vehicle axle; and g) repetition of steps c) to f), until the at least one of the loading process, the unloading process, and the levelling of the stationary vehicle is terminated.

8. The method of claim 7, wherein the wheel brakes are actuated individually or in groups.

9. The method of claim 7, wherein the wheel brakes are engaged and released such that, in an event of an employment of a pneumatic braking system, compressed-air consumption is minimized and in addition to a prevention of any unintentional roll-away of the vehicle a reduction of mechanical stresses is nevertheless achieved.

10. The method of claim 7, wherein the wheel brakes are engaged and released such that, in addition to a prevention of any unintentional roll-away of the vehicle, a maximum possible reduction of mechanical stresses is achieved.

11. The method of claim 7, wherein the wheel brakes which are to be released or engaged in method steps d) and e) are selected in accordance with a plausibility check of axle load values, from the on-board vehicle axle load measurement system, which is executed during or after process step c).

12. The method of claim 7, wherein the predefined time interval varies between 1 second and 10 minutes, in accordance with a speed of load variations associated with the at least one of the loading process, the unloading process, and the levelling of the stationary vehicle.

13. The method of claim 7, wherein at least one wheel brake remains engaged at any time during the at least one of the loading process, the unloading process, and the levelling of the stationary vehicle.

14. The method of claim 13, wherein all the wheel brakes on at least one vehicle axle remain engaged, in order to prevent any oblique pull of the vehicle in relation to a longitudinal axis of the vehicle.

15. The method of claim 7, wherein a transition between the engaged or released state of each wheel brake, or vice versa, is executed softly rather than abruptly.

* * * * *